July 4, 1967

L. E. LINDSEY ETAL 3,329,767

INSULATOR MOUNTING BRACKET

Filed July 22, 1965

INVENTORS.
L. E. LINDSEY
HERBERT F. SAMMONS
BY
ATTORNEY

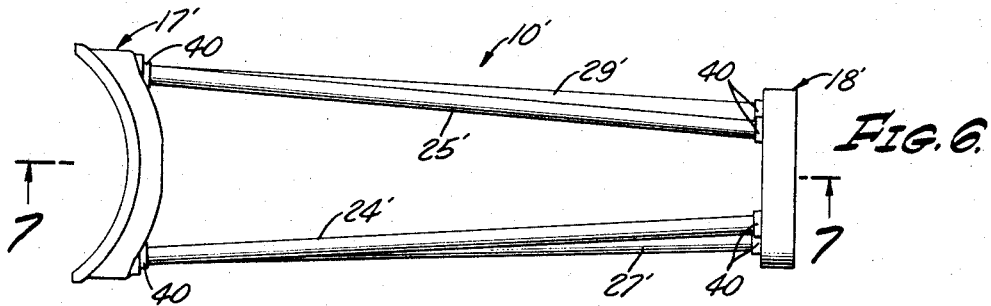
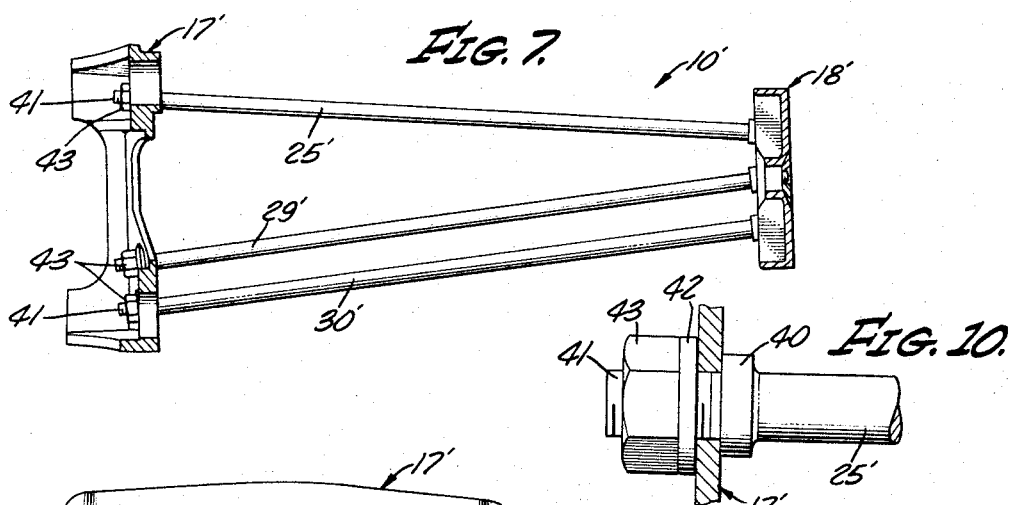
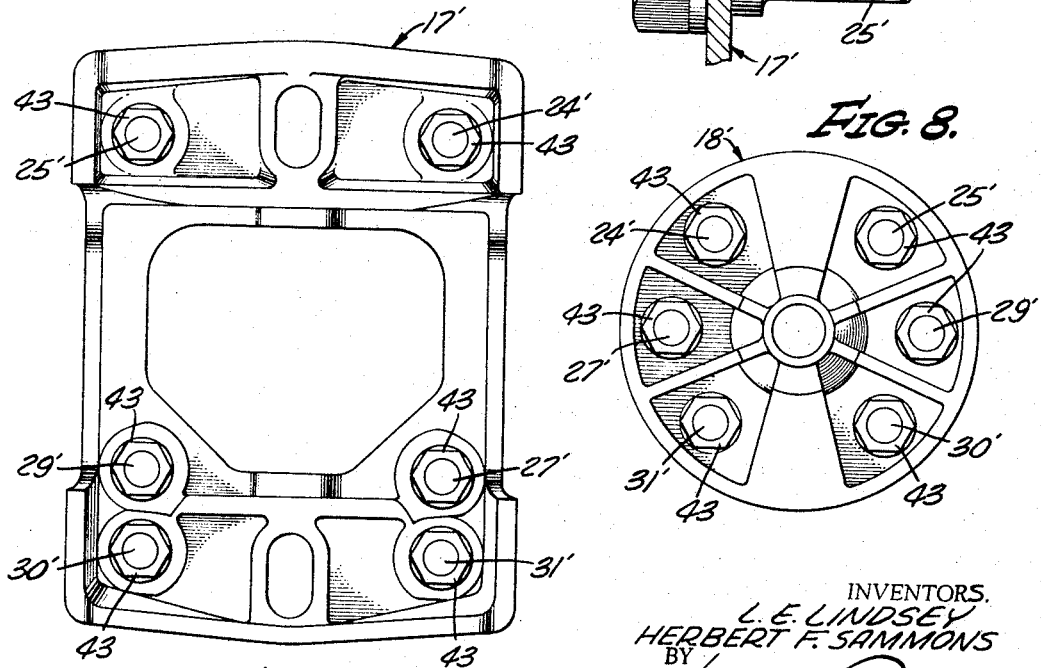

United States Patent Office 3,329,767
Patented July 4, 1967

3,329,767
INSULATOR MOUNTING BRACKET
L E. Lindsey, 222 Vista Ave., Pasadena, Calif. 91107, and Herbert F. Sammons, La Crescenta, Calif.; said Sammons assignor to said Lindsey
Filed July 22, 1965, Ser. No. 473,994
10 Claims. (Cl. 174—158)

This invention relates to brackets and more particularly to a heavy duty, rugged cantilever bracket suitable for use in supporting a high tension power line insulator in a generally horizontal position outward from supporting structure such as a tower or an upright pole.

The invention bracket is formed with a mounting plate and an insulator support plate at its opposite ends rigidly and immovably interconnected by a plurality of struts arranged to provide maximum resistance to torsional loads as well as loads acting transversely of the struts. For this purpose the struts are arranged along the opposite laterally and vertically spaced sides for maximum effectiveness. Additionally and importantly, the design strength of the struts is so selected relative to the breaking strength of the insulator for use therewith, that the struts fail in bending prior to failure of the insulator. In consequence, a power line failure may cause flexing and damage to one or more of the relatively inexpensive brackets thereby absorbing the sudden release of energy and saving the expensive insulators. Moreover, the power line is normally retained captive by the insulators and the risk of injury from a loose live wire is minimized.

Heretofore it has been customary to support high tension power lines from one end of suitable insulators supported in a generally vertical position from supporting arms of either a tower or a pole structure. This practice is subject to several disadvantages of both a cost and a structural nature viewpoint. In the first place it is necessary that the pole be sufficiently high to permit vertical support of the insulators and, at the same time, provide adequate clearance of the conductors above ground in areas between adjacent towers. It is also important to provide bulky and costly rigid arm structures for supporting the insulators at appropriate distances outward from the tower structure proper.

The primary object of the present invention is to provide an improved and simplified rigid support structure for insulators avoiding the serious disadvantages of prior constructions such as the typical ones pointed out above. More specifically there is provided by the present invention a unitary one-piece mounting bracket having a minimum number of components rigidly secured together and specially designed for attachment directly to the sides of a supporting structure, such as a pole, and having provision at their outer end for attaching the base of a high tension insulator. The completed bracket and insulator assembly projects generally horizontally from the opposite sides of the pole structure to provide the necessary spacing between two or more high tension conductors while using a minimum amount of supporting hardware. Each bracket structure utilizes a minimum number of components arranged for maximum strength and supporting ability both as respects vertical loads and torsional and laterally acting loads while, at the same time, preferably being designed to buckle under a load stress less than that effective to break the supported insulator. In consequence the more costly insulator usually does not fail, and only the relatively inexpensive bracket needs replacement.

Essentially the invention mounting bracket comprises a pair of base plates held rigidly supported remotely from one another by a plurality of rigid struts each arranged at an angle to another and mutually cooperating to resist tension, compression and torsion loads.

Accordingly it is a primary object of the present invention to provide a simplified, rugged power line construction featuring insulator mounting brackets designed to be secured to an upright supporting structure and having provision at the outer end for securement to the base end of an insulator.

Another object of the invention is the provision of an insulator mounting bracket comprising a unitary rigid structure employing a plurality of plates held rigidly separated by cooperating structs.

Another object of the invention is the provision of an insulator mounting bracket designed to support a high tension insulator cantilever-fashion generally horizontally and to fail under a low stress below that causing failure of the insulator thereby retaining a severed power conductor captive and allowing a group of brackets closest to the severed conductor to absorb the loading change gradually.

Another object is the provision of an insulator bracket formed by a pair of base plates held rigidly spaced apart by a plurality of strut members held assembled to the base plates by threaded fastener means.

Another object of the invention is the provision of simple rugged unitary bracket means for attachment to a vertically disposed support surface for use in supporting a power conductor or the like from its outer end.

These and other more specific objects will appear upon reading the following specification and claims and upon considering in connection therewith the attached drawings to which they relate.

Referring now to the drawings in which two preferred embodiments of the invention are illustrated:

FIGURE 6 is a top plan view of a second preferred embodiment of the invention;

FIGURE 7 is a cross-sectional view taken along line 7—7 on FIGURE 6;

FIGURE 8 is an end elevational view of the outer base plate on an enlarged scale;

FIGURE 9 is a rear elevational view of the mounting base plate on an enlarged scale; and FIGURE 10 is a fragmentary view of one of the strut connections on an enlarged scale.

Figure 1:
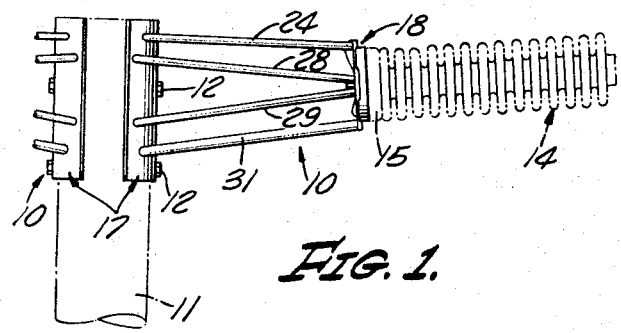
FIGURE 1 is a fragmentary elevational view showing a pair of the mounting brackets secured to the opposite sides of a pole.
Figure 4:
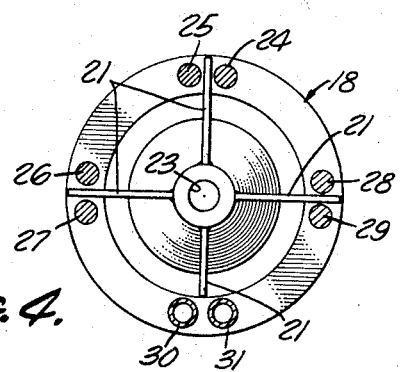
FIGURE 4 is a cross-sectional view taken along line 4—4 on FIGURE 3.

Referring initially more particularly to FIGURE 1, there is shown a preferred embodiment of the invention mounting bracket designated generally 10, a pair of which are shown rigidly anchored to the diametrically opposed faces of pole 11 as by through bolts 12. A high tension insulator 14, of typical construction and indicated in dot and dash lines, has its base end 15 seated on and rigidly secured to the outer end of these brackets. Although not shown, it will be understood that insulator 14 is provided with suitable clamping means at its outer end by which the power conductor is held in assembled position.

Referring now to FIGURES 2 through 5, the details of the mounting bracket will be described. As there shown each bracket comprises a pair of base plates 17 and 18 at its inner and outer ends, respectively. Base plate 17 is formed of suitable material as cold rolled steel or a high strength ductile iron shaped to conform to the surface against which it is to be anchored. Base plate 18 is substantially smaller in area than plate 17 and is preferably cast and formed with suitable reinforcing ribs 21 and with a seat 22 against which the base 15 of insulator 14 seats. Suitable clamping means for holding the insulator to bracket 10 includes a shank passing through the opening 23 centrally of base plate 18.

Figure 3:
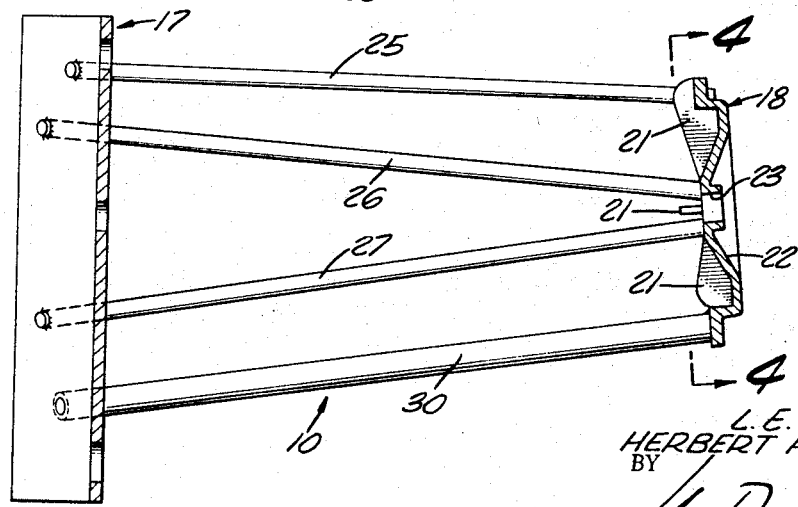
FIGURE 3 is a vertical section view of the bracket taken along line 3—3 on FIGURE 2.

The two base plates are held rigidly in spaced apart relation by a plurality of strut members. For maximum strength, the strut members are shown as arranged in pairs along the opposite sides and along the upper and lower portions of the base plate. The inner ends of these struts are preferably anchored in pairs closely adjacent the corner areas of base plate 17. In the interest of maximum strength and rigidity the struts from an adjacent pair of base plate corners converge toward the intervening midrim portion of the outer base plate. For example struts 24, 25 on the top side of the bracket have their inner ends connected to the upper corners of plate 17 whereas their outer ends are connected to the upper midrim portion of plate 18, as is made clear by FIGURE 5. Likewise the two struts 26, 27 along the far side of the bracket, as viewed in FIGURE 3, are anchored to the rear mid-portion of base plate 18. The same is likewise true of side struts 28, 29 on the near side of the bracket as shown in FIGURE 1. The lowermost pair of struts 30, 31 are assembled in like manner but, as herein shown by way of example, comprise tubes rather than rods.

Figure 2:
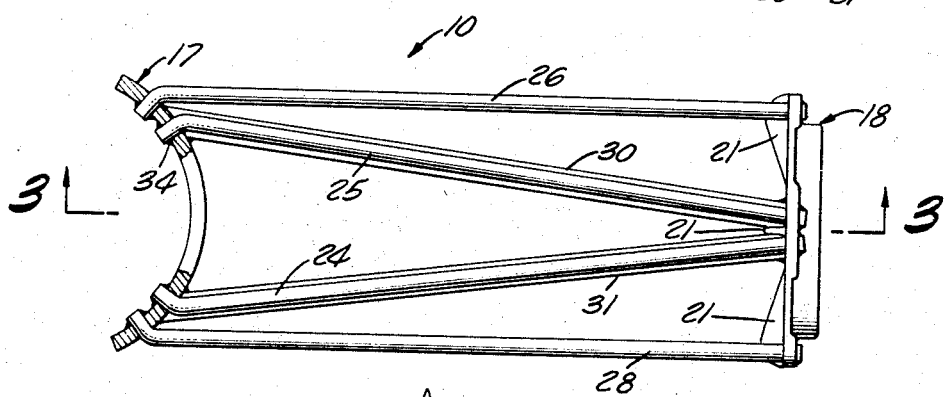
FIGURE 2 is a vertical plan view on an enlarged scale of the mounting bracket with parts broken away.
Figure 5:
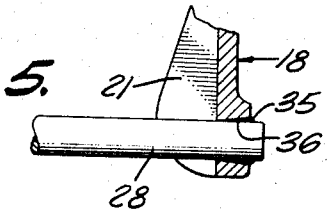
FIGURE 5 is a fragmentary view on an enlarged scale showing a typical joint between the strut and the outer base plate.

The struts extend through openings in the two base plates and are anchored thereto in any suitable manner as by welding 34 and 35 (FIGURES 2, 5). Desirably plate 18 is formed with cored openings 36 which taper slightly or flare to facilitate making a long high-strength brazed or welded joint. It will also be understood that the struts may be threaded and provided with nuts lying against either face of the plates to hold the components clamped in assembled position.

From the foregoing, it will be recognized that each strut of an adjacent pair are inclined toward one another and cooperating with other pairs of struts in providing an unusually strong rigid bracket capable of withstanding extremely high loading of all characters, including torsional, likely to be encountered in use. It is further pointed out that the entire structure is preferably coated with any suitable durable corrosion resistant material after it has been fully assembled.

Referring now to FIGURES 6 through 10 showing a second preferred embodiment of the invention, it is pointed out that the same or similar components of the insulator mounting bracket are identified by the same reference numerals as used in describing FIGURES 1 to 5 but are distinguished therefrom by the addition of a prime. It will be understood that the bracket construction of FIGURES 6 to 10 differs essentially from that described above in that base plates 17', 18' are both high strength castings arranged, as in the preferred embodiment, in slightly nonparallel planes, that is, with the insulator contacting face of base plate 18' inclined slightly to the vertical. The two base plates are interconnected by rod strut members arranged in two groups along either vertical edge of the base plates. Each group along either lateral side of the bracket preferably includes a pair of closely spaced rods, as 29', 30' and 27', 31', along the lower lateral edges of the bracket and at least one rod along either upper lateral edge of the bracket. This arrangement provides an exceptionally strong cantilever bracket capable of carrying the heavy loads and changing strains prevalent in power line operations yet capable of failing by flexure of the rods prior to failure of the insulator supported by the bracket, a feature of the invention further described below. As is best shown in FIGURE 10, each rod is provided with an integral collar 40 inwardly of its opposite ends and at the base end of threaded portions 41. These threaded shanks extend through snug fitting openings in the base plates and are held assembled thereto as by a spring washer 42 and a clamping nut 43.

As in the first described embodiment, each of the struts is arranged at an inclination to each of the other struts although, in general, the angle of inclination is somewhat less than shown in the first embodiment and cooperate in providing a high strength rigid bracket assembly capable of resisting tension, compression and torsional loads.

One of the important features of both bracket constructions is that the strut members are preferably designed to buckle or give way under a load stress less than that at which the insulator proper fails. For example, in a typical assembly a high tension insulator designed to fail at 2800 pounds load would be supported on a bracket 10, 10' designed to buckle under—say 2300 pounds loading. This feature of the invention has important advantages in that the relatively inexpensive brackets invariably give way before the relatively expensive insulator. Furthermore, except for the buckling of the invention bracket the failure of an insulator when the power line itself is severed or fails can lead to the loss of a considerable number of the insulators. This is because the sudden severing of the line imposes a sharp bending stress on the insulators which, being incapable of bending, characteristically fail suddenly thereby abruptly releasing the entire load to the next insulator along the line. These insulators then fail in succession, causing extensive and costly damage. On the other hand, when using the invention brackets, severing of the line, though occurring suddenly, causes the brackets to fail in bending. This failure occurs relatively slowly as the insulator and supporting bracket bend through a wide arc. This gradual release of the load to other brackets to either side of the break in the line may result in one or more additional brackets partially failing. However, the load absorbed as each bracket buckles results in a marked reduction in the load transmitted to the next insulator thereby substantially limiting the number of damaged brackets.

While the particular insulator mounting bracket herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A cantilever mounting bracket for supporting a power line insulator with its axis generally horizontal from the side of a rigid support for said bracket, said bracket comprising a first base plate contoured on one side to fit against the rigid support to which said base plate is to be secured and having means for securing said first base plate rigidly to a generally vertically disposed rigid support, a second base plate spaced remotely from said first base plate and adapted to be rigidly secured to the base end of a horizontally extending power line insulator, and a plurality of elongated strut members having their opposite ends rigidly and immovably connected to a respective one of said base plates, and adjacent ones of said struts being acutely inclined relative to one another such that at one of said base plates the adjacent ends are spaced widely from one another whereas at the other base plate the adjacent ends of the same struts are relatively close together and effective in resisting load stresses acting transversely of the length of said cantilever mounting bracket.

2. A cantilever mounting bracket for supporting a power line insulator from one end and with the insulator axis generally horizontal, said mounting bracket having a first and a second base plate, said first base plate having means for rigidly anchoring the same against the vertical face of an upright support therefor, said second base plate having provision for anchoring the same to the base end of an insulator, a plurality of elongated rigid struts rigidly and immovably interconnecting said first and second base plates, and a plurality of pairs of said struts having one set of adjacent ends secured to said first base plate in widely spaced relation and their other set of ends secured to said second base plate in closely spaced relation, and wherein said pairs of struts include first and second pairs of struts lying in separate vertically spaced apart planes and third and fourth pairs of struts in separate horizontally spaced planes along either side of said bracket in the installed position thereof and mutually cooperating with one another in providing a high strength rigid cantilever bracket.

3. A mounting bracket as defined in claim 2 characterized in that certain of said struts are formed of solid rod stock and certain other of said struts are formed of tubular stock.

4. A cantilever mounting bracket adapted to be clamped against the side of an upright pole and used to support an insulator projecting outwardly from the outer end thereof, said mounting bracket comprising first and second base plates lying generally parallel but widely spaced from one another, said first base plate being generally rectangular and curved to lie against the face of a pole, said first base plate having means for clamping the same firmly and immovably to the face of a pole, said second base plate being generally circular and smaller in area than said first base plate, a plurality of pairs of struts having one end of each secured rigidly and immovably to the respective corner areas of said rectangular base plate, the opposite ends of said pairs of struts converging toward one another and being rigidly connected to said second base plate in an area generally midway between the closest pair of corners of said first base plate, said struts including a first and second pair lying in separate vertically spaced planes and third and fourth pairs in separate horizontally spaced planes along either lateral side of said bracket in the installed position thereof on a pole, and at least some of said struts having a design strength substantially less than the failure strength of the insulator adapted to be mounted on said bracket whereby said struts fail by bending while retaining the insulator captive and undamaged.

5. A mounting bracket as defined in claim 4 characterized in that the ends of said struts extend into holes formed in said first and second base plates, and welding holding each of said strut ends secured to a respective one of said holes.

6. In combination, an elongated high tension insulator and a supporting bracket therefor adapted to support the insulator cantilever-fashion from the side of a supporting structure for said bracket, said bracket including a pair of base plate members rigidly interconnected by a plurality of long struts arranged at an angle to one another with their opposite ends rigidly connected to a respective one of said plate members, and said bracket being further characterized in that the load supporting strength of said insulator is substantially greater than the load supporting strength of said bracket whereby said bracket buckles and fails and protects the insulator against failure.

7. In combination, an elongated high tension insulator and a supporting bracket therefor adapted to support the insulator cantilever-fashion from the side of a supporting structure for said bracket, said bracket including a pair of base plate members rigidly interconnected by a plurality of long struts arranged at an angle to one another with their opposite ends rigidly connected to a respective one of said plate members, and said bracket having a design strength materially less than the design strength of said insulator whereby said struts buckle and bend while retaining the insulator itself and a power conductor clamped thereto captive and supported out of contact with the ground.

8. In combination, an elongated high tension insulator and a supporting bracket therefor adapted to support the insulator cantilever-fashion from the side of a supporting structure for said bracket, said bracket including a pair of base plate members rigidly interconnected by a plurality of long struts arranged at an angle to one another with their opposite ends rigidly connected to a respective one of said plate members, and said bracket having a buckling strength substantially less than the breaking strength of said insulator whereby the sudden severing of a power conductor clamped to the outer end of said insulator results in the gradual and progressive buckling of the struts of said bracket while retaining the insulator and conductor captive on the outer end of said bracket and whereby damage to other bracket and insulator assemblies along a power line is limited and confined to those assemblies closest to the point of overload on the power line.

9. In combination, an elongated high tension insulator and a supporting bracket therefor adapted to support the insulator cantilever-fashion from the side of a supporting structure for said bracket, said bracket including a pair of base plate members rigidly interconnected by a plurality of long struts arranged at an angle to one another with their opposite ends rigidly connected to a respective one of said plate members, said struts having threaded ends merging with enlarged collars integral with the main body of said struts, said collars being positioned to seat against the adjacent faces of said base members and to be firmly and rigidly clamped thereagainst by nut means mounted on said threaded ends and tightened against the outer faces of said base members.

10. A cantilever mounting bracket for a horizontally supported high tension insulator and adapted to be clamped against the vertically disposed side of an upright power pole or the like, said cantilever bracket comprising a relatively large and a relatively small base plate one of which is adapted to be clamped rigidly against the side of the pole and the other of which is adapted to be rigidly clamped to the base end of a horizontally supported high tension insulator, two groups of long rod-like strut members interconnecting said base plates along the opposite lateral sides thereof and with the outer end of the rods of said groups converging at a small angle to one another, said rods having threaded ends and integral collars about the adjacent portions of said threaded ends, said threaded ends extending through an associated opening through said base plates and being rigidly and immovably clamped thereto by nut means mating with said threaded ends, and each of said groups of rods including a pair of rods spaced closely together along either lower lateral edge of said bracket and at least one rod extending along either upper lateral edge of said bracket.

References Cited

UNITED STATES PATENTS

| 885,678 | 4/1908 | Steinberger | 174—45 |
| 1,843,454 | 2/1932 | Manson | 248—221 |
| 3,264,405 | 8/1966 | Fiero | 174—158 |

FOREIGN PATENTS

| 858,980 | 5/1940 | France. |
| 79,408 | 11/1918 | Switzerland. |

ROY D. FRAZIER, *Primary Examiner.*

CHANCELLOR E. HARRIS, *Examiner.*

F. DOMOTOR, *Assistant Examiner.*